(12) United States Patent
Hunleth et al.

(10) Patent No.: US 9,063,580 B2
(45) Date of Patent: Jun. 23, 2015

(54) KEYBOARDLESS TEXT ENTRY

(75) Inventors: Frank A. Hunleth, Rockville, MD (US); Frank A. Wroblewski, Gaithersburg, MD (US); Daniel Simpkins, Bethesda, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 376 days.

(21) Appl. No.: 13/079,255

(22) Filed: Apr. 4, 2011

(65) Prior Publication Data

US 2012/0119995 A1    May 17, 2012

Related U.S. Application Data

(62) Division of application No. 11/063,630, filed on Feb. 23, 2005, now abandoned.

(60) Provisional application No. 60/546,750, filed on Feb. 23, 2004, provisional application No. 60/546,847, filed on Feb. 23, 2004.

(51) Int. Cl.
| | |
|---|---|
| G06F 3/048 | (2013.01) |
| G06F 3/023 | (2006.01) |
| H04N 5/445 | (2011.01) |
| H04N 7/01 | (2006.01) |
| H04N 21/422 | (2011.01) |
| H04N 21/431 | (2011.01) |
| H04N 21/442 | (2011.01) |
| H04N 21/443 | (2011.01) |
| H04N 21/45 | (2011.01) |
| H04N 21/482 | (2011.01) |
| H04N 21/485 | (2011.01) |

(52) U.S. Cl.
CPC ............ *G06F 3/0236* (2013.01); *G06F 3/0237* (2013.01); *H04N 5/44543* (2013.01); *H04N 7/0122* (2013.01); *H04N 21/42206* (2013.01); *H04N 21/4312* (2013.01); *H04N 21/44222* (2013.01); *H04N 21/4438* (2013.01); *H04N 21/4532* (2013.01); *H04N 21/4828* (2013.01); *H04N 21/485* (2013.01)

(58) Field of Classification Search
USPC ................. 715/834, 835, 700, 841, 788, 780, 715/856–858; 345/156, 168, 184
See application file for complete search history.

(56) References Cited

U.S. PATENT DOCUMENTS

| | | | |
|---|---|---|---|
| 5,812,117 A * | 9/1998 | Moon | ........................... 345/169 |
| 6,011,542 A | 1/2000 | Durrani et al. | |
| 6,212,297 B1 | 4/2001 | Sklarew | |
| 6,374,275 B2 | 4/2002 | Wasilewski | |

(Continued)

OTHER PUBLICATIONS

Roy Kaplow et al.; A computer-terminal, hardware/software sytem with enhanced user input capabilities; Summer 1976, ACM SIGGRAPH Computer Graphics, vol. 10, Issue 2, pp. 116-124.*

(Continued)

*Primary Examiner* — Linh K Pham
*Assistant Examiner* — Tam Tran
(74) *Attorney, Agent, or Firm* — Patent Portfolio Builders PLLC (57) ABSTRACT

Keyboardless text entry methods and systems are described. Various display tools are used in conjunction with, for example, pointing, scrolling and/or clicking actions to enter text into an interface. One display tool is a pie widget shape, another display tool uses a box like shape containing other box like shapes which are scaled according to a proportionate chance of containing the desirable selection.

4 Claims, 12 Drawing Sheets

(56) References Cited

U.S. PATENT DOCUMENTS

| | | |
|---|---|---|
| 6,448,987 B1 | 9/2002 | Easty et al. |
| 6,622,148 B1* | 9/2003 | Noble et al. .................. 707/792 |
| 6,629,077 B1 | 9/2003 | Arling et al. |
| 6,744,427 B2 | 6/2004 | Maglio et al. |
| 2002/0027549 A1 | 3/2002 | Hirshberg |
| 2002/0122072 A1 | 9/2002 | Selker |
| 2002/0156615 A1* | 10/2002 | Takatsuka et al. ................ 704/1 |
| 2003/0016253 A1* | 1/2003 | Aoki et al. .................... 345/863 |
| 2004/0078389 A1* | 4/2004 | Hamilton .................. 707/104.1 |
| 2004/0253973 A1* | 12/2004 | Nguyen et al. ............. 455/550.1 |
| 2004/0268393 A1 | 12/2004 | Hunleth et al. |
| 2005/0223308 A1 | 10/2005 | Gunn et al. |
| 2006/0095844 A1 | 5/2006 | Van Leeuwen |

OTHER PUBLICATIONS

Bederson, B., et al., "Ordered and Quantum Treemaps: Making Effective Use of 2D Space to Display Hierarchies", ACM Transactions on Graphics (TOG), vol. 21, Issue 4, Oct. 2002, pp. 833-854, Abstract, New York, NY.

Garrett, M., et al. "Implementation of Dasher, an Information Efficient Input Mechanism", Cavendish Laboratory, May 2003, pp. 1-5, United Kingdom.

Examiner's Answer issued in corresponding U.S. Appl. No. 11/063,630, with a notification date of May 1, 2008.

\* cited by examiner

KEYBOARDLESS TEXT ENTRY

RELATED APPLICATIONS

This application is a divisional application of Ser. No. 11/063,630 filed on Feb. 23, 2005 and is related to, and claims priority from, U.S. Provisional Patent Application Ser. No. 60/546,750, filed on Feb. 23, 2004, entitled "A Zoomable Interface for Keyboard-less Text Selection and Entry", the disclosure of which is incorporated here by reference. This application is also related to, and claims priority from, U.S. Provisional Patent Application Ser. No. 60/546,847, filed on Feb. 23, 2004, entitled "Pie-Widget Keyboard-less Text Entry", the disclosure of which is incorporated here by reference.

BACKGROUND

The present invention describes systems and methods for keyboardless text entry on a display for a wide variety of consumer electronic devices such as TVs, PCs, touch screens and interactive kiosks.

Technologies associated with the communication of information have evolved rapidly over the last several decades. Television, cellular telephony, the Internet and optical communication techniques (to name just a few things) combine to inundate consumers with available information and entertainment options. As the amount of information available increases, the need to access and use this data has grown. Not only the overall amount of information available to the consumer has grown, but the variety of devices that are interactive, such as, PCs, TVs, and PDAs, have also grown. To easily enter alphanumeric data, keyboards are typically used on PCs a legacy of the typewriter. However, as more and different types of interactive devices become available to consumers, a keyboard is not always the best method of interaction. For example, keyboards suffer the drawbacks of being relatively large, costly, and requiring more skill to use efficiently than many remote control devices. To solve this problem, methods of keyboardless text entry have been created.

One example of keyboardless text entry is a touch screen where an image of a standard (i.e. QWERTY) keyboard is displayed on the screen. This solution benefits from providing a familiar layout for users and removing a physical keyboard, but suffers from other drawbacks. For example, the user's hands may obscure displayed outputs as he or she enters text by touching keys displayed on the virtual keyboard.

Another example of keyboardless text entry is a system where keystrokes are drawn with a stylus on a touch pad. These drawn keystrokes are then translated into alphanumeric characters and displayed. Some drawbacks associated with this method are the need to enter multiple keystrokes for some of the characters, and the need to learn the strokes that match each character. Yet another method of keyboardless text entry is entering text using a voice recognition device (as described, for example, in U.S. Pat. No. 6,629,077). In this method a voice input is matched to a voice command template and if a valid input is received, a corresponding character is input to a consumer electronic device. Drawbacks associated with this method include a lack of robustness in a noisy environment and the potential for extensive training of detection software.

Accordingly, it would be desirable to provide keyboardless text entry systems and methods which minimize or avoid the drawbacks associated with the keyboardless text entry systems described above.

SUMMARY

Systems and methods according to the present invention address this need and others by providing techniques for keyboardless text entry. According to one exemplary embodiment, a method for entering characters into an interface includes the steps of displaying a text entry tool having a center and a plurality of sectors relative to the center, each of the sectors associated with at least one character, selecting one of the characters by selecting an associated sector; and entering the selected one of the characters into the interface in response to a predetermined event occurring subsequent to the selection step.

According to another exemplary embodiment of the present invention, an interface input method includes the steps of selecting one of a plurality of objects provided on a display, the selected object being associated with at least one character from a first group of characters, zooming into the selected object, revealing a plurality of additional objects, each associated with one character from a second group of characters, the second group of characters including those characters which are potentially selectable given said at least one character from the first group and selecting one of the plurality of additional objects to enter a text into an interface.

According to yet another exemplary embodiment of the present invention, an interface input method includes the steps of displaying two rows of keys proximate an edge of a display screen, each key being associated with one character, selecting one of the keys, displaying the one character associated with the selected key in a text box on the display screen; and displaying candidate items for selections in a display area beside the two rows of keys, wherein the candidate items for selection are chosen based on text displayed in the text box.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

First Exemplary Embodiment

Pie Widget Text Entry Interface

Figure 1:
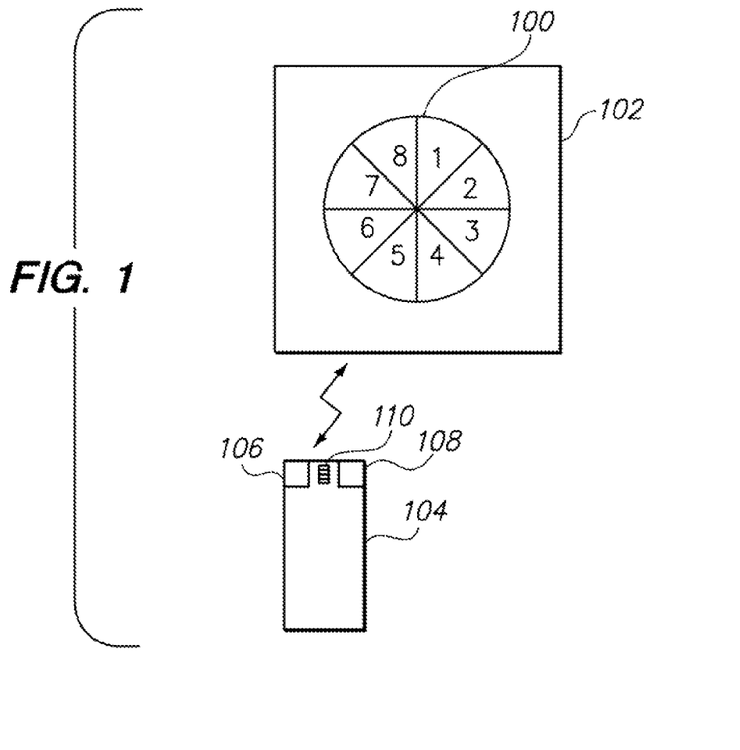
FIG. 1 illustrates a communication loop between a display showing a keyboardless text entry tool and a pointing and/or scrolling device according to an exemplary embodiment of the present invention.

The present invention provides methods and systems for easily and efficiently entering text using a pointing and/or scrolling device in combination with a visual display. According to a first exemplary embodiment of the present invention a "pie widget" is displayed on a television, computer monitor or any other output screen and can be used for, among other things, text entry without the need for a keyboard. A conceptual illustration of this keyboardless text entry tool is shown in FIG. 1. Therein, a pie widget 100 is displayed on a screen 102 and can be used to enter characters via remote control device 104. In this example, the remote control device has two buttons 106, 108 and a scroll wheel 110 and communicates wirelessly (or via wireline) with the system running the application which employs the pie widget 100 as a keyboardless entry tool. Those skilled in the art will appreciate that exemplary embodiments of the present invention can be used with any system, application or remote control device and that those mentioned herein are purely exemplary. Specific examples of such systems, applications and remote control devices may be found in U.S. patent application Ser. No. 10/768,432, filed on Jan. 30, 2004, entitled "Control Framework with a Zoomable Graphical User Interface for Organizing, Selecting and Launching Media Items", the disclosure of which is incorporated here by reference.

Figure 2:
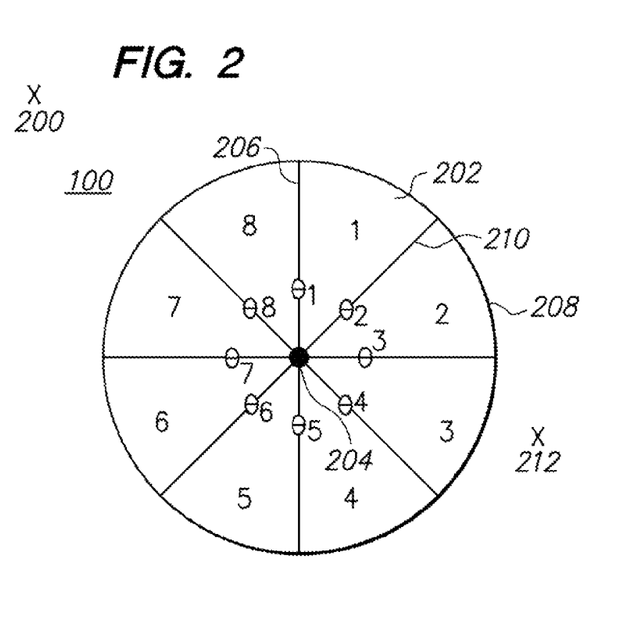
FIG. 2 depicts an exemplary keyboardless text entry tool and an associated angular reference system according to an exemplary embodiment of the present invention.

The exemplary pie widget 100 has a plurality of unique wedges or sectors 202, as also shown in the magnified view of FIG. 2. According to this exemplary embodiment of the present invention, each sector 202 is associated with a single character which can be selected by a user. In the example of FIG. 2, there are eight sectors, each of which is uniquely associated with the individual numerals "1-8" which are displayed therein on the display. The area within each sector 202 can be defined, for example, using central angles relative to a center point 204 of the pie widget 200 and a reference line 206. In this example, the reference line 206 is selected as the line which is oriented vertically relative to the display, however those skilled in the art will appreciate that other reference lines could be used. Using this framework, each sector 202 can be defined as an area between two lines each of which radiate from the center point 204 along two different central angles, optionally bounded at the edge of the pie widget 200 by a perimeter line 208. For example, the sector 202 associated with the numeral "1" can be defined as the area between the lines 206 and 210 which radiate from center point 204 along angles θ1 and θ2, respectively. Since there are eight sectors 202 in the example of FIG. 2, and since each sector has the same size, angle θ1=0 degrees and angle θ2=45 degrees in this purely illustrative example.

For a character to be chosen using the pie widget 200, a user selects a sector 202 associated with a character. According to exemplary embodiments described herein each sector 202 is associated with only a single character such that a user enters each character by selecting a single sector. However those skilled in the art will appreciate that the present invention is equally applicable to embodiments wherein more than one character or a range of characters are associated with each sector. Various techniques can be used to perform character selection using the pie widget 200. According to one exemplary embodiment, once a cursor 212 is stationary for a predetermined amount of time, the character associated with the sector in which the cursor is located or associated with is selected. For example, an invisible line can be drawn between the cursor 212 and the center point of the pie 204. The angle associated with this line is then compared with the angles associated with the predetermined sectors (e.g., θ1-θ8 in the example of FIG. 2) and the corresponding character is entered. In the example shown in FIG. 2, an invisible line drawn from cursor 212 to the center of the pie crosses is disposed in the sector corresponding to the number "3" so the number "3" would be the character entered by the pie widget 200.

Note that the perimeter 208 of the pie widget 200 need not limit the selection area for the cursor 212. Alternatively, any cursor position on the display may fall within a predefined sector and could be used for character selection and entry (possible exceptions to this include invalid areas such as the text box and the word list box described below and show in FIG. 3). This latter feature may provide additional ease of pointing and selection, because the farther away from the center of the circle, the larger the selection area and the easier it is for a user to accurately point to the intended character space. The above examples illustrate one exemplary technique to set up a reference system for a pie widget keyboardless text entry tool according to this exemplary embodiment of the present invention, however those skilled in the art will appreciate that other reference systems could be used to implement this embodiment invention.

Figure 3:
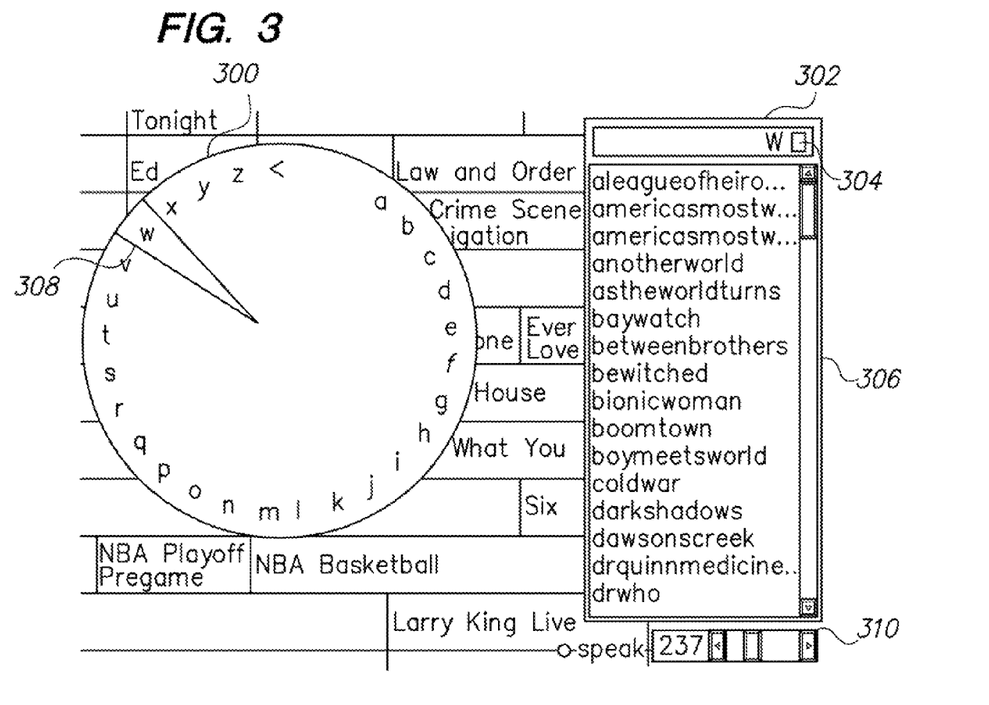
FIG. 3 illustrates a keyboardless text entry tool, a text box, and scrollable word list overlaying a channel guide according to an exemplary embodiment of the present invention.

The pie widget can, according to one exemplary embodiment, be implemented as a circular pie menu with the characters arranged around the pie widget 300 as shown in FIG. 3. In this example the letters "A" to "Z", a "blank space", and the "<" symbol can be used for text entry, spacing between characters, and deletion, respectively. A text box 302 can be located in the upper right above the scrollable word list box 306, and contains a text box cursor 304. Entering the "<" key would delete the character to the left of the text box cursor 304. Characters can be selected by pointing to one of the sectors, e.g., by moving a cursor or rotating a scroll wheel. The pointed to slice can be identified prior to selection, e.g., by highlighting or changing the color of the sector over which the cursor is currently positioned. While the sector remains identified in this way the character will not be selected. The user can thus move the cursor across multiple sectors without selecting a character. A timer is restarted each time the user moves to a different sector. When the timer expires the character is inserted, e.g., as shown in FIG. 3 by the "w" in the text box to the left of the text cursor and the visual indication associated with that sector 308 is changed, e.g., the green coloring is changed to red. This sequence is repeated for as many characters as desired. In an exemplary embodiment of the present invention, the words in the scrollable word list 306 could represent possible selections with another program, such as a channel guide as shown in FIG. 3, which could allow the user to move the channel guide to the program which is finally selected in the scrollable word, list for example. Although use of a timer means that text entry according to this exemplary embodiment of the present invention does not require button pressing, the remote control device 104's buttons can be used as alternative indications that a final text entry selection has been made.

Figure 4:
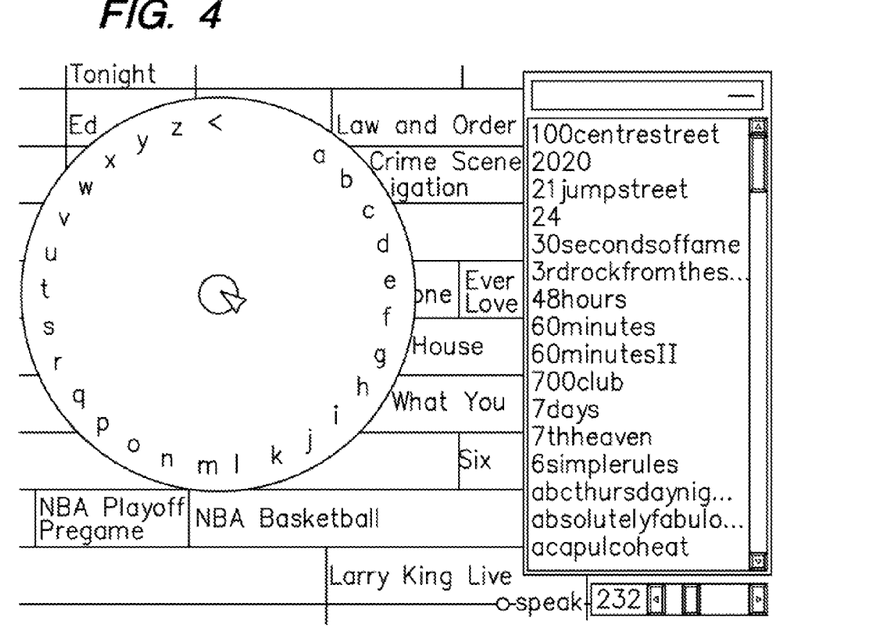
FIG. 4 shows another view of the keyboardless text entry tool of FIG. 3.
Figure 8:
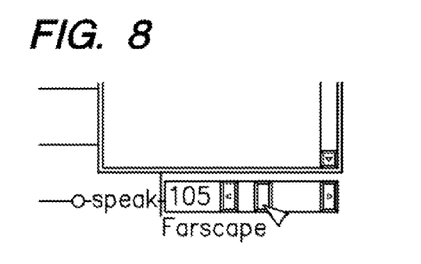
FIG. 8 depicts an adjustable timer usable in conjunction with the keyboardless text entry tool of FIGS. 3-7.

The timer 310 can be adjusted manually with the horizontal slider located below the scrollable word list box 306. Alternatively or additionally the timer value can be automatically adjusted based on user behavior over time and be displayed numerically as in FIG. 8, for example. For example if the user is frequently deleting and re-entering characters, the pie widget 200 can automatically increase the timer period to allow the user more time between initial selection of a character and the pie widget 200 considering the initial selection to be a final selection that is then provided as a text entry. Conversely, if the user rarely changes any entered character, and/or if her or she frequently uses a manual selection technique, e.g., pressing a button on remote control device 104 after initial selection of a character, to expedite final selection, then the pie widget 200 can automatically decrease the timer period. FIG. 4 shows another technique for character deletion in the pie widget 200 by pointing to the center circle which can reset text entry and delete any characters chosen up to that point.

Figure 5:
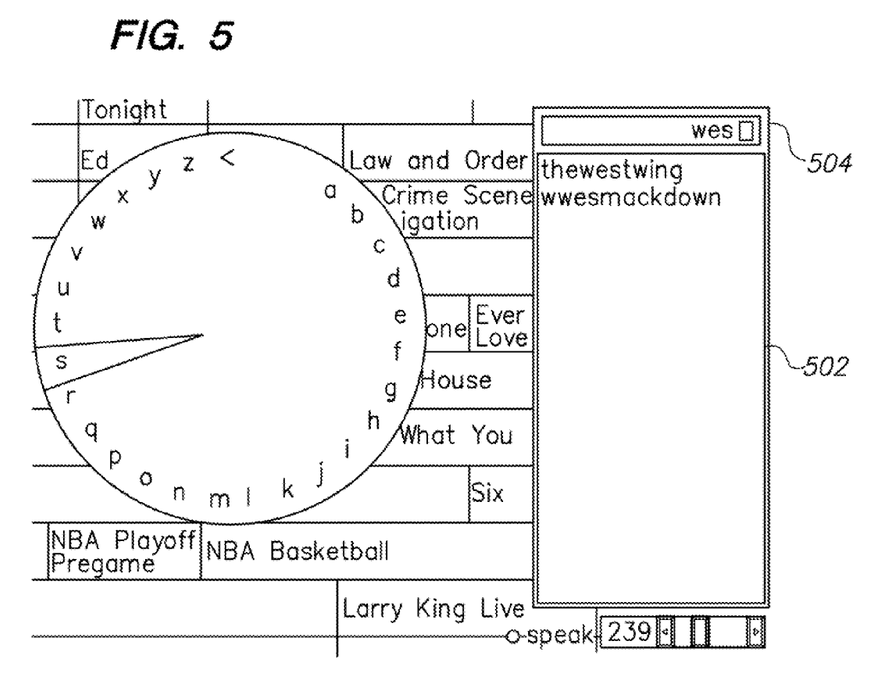
FIG. 5 shows a scrollable word list based on a partially entered word associated with the keyboardless text entry tool of FIGS. 3-4.

According to exemplary embodiments of the present invention, as each character is selected it can be inserted to the left of the text box cursor. As shown in FIG. 5, the last letter selected is an "s". As each letter is selected the resultant partial word is used to search a list of words stored by the system, e.g., a dictionary of potential selections. Any word that contains the selected characters will appear in the scrollable word list box 502 below the text box 504. Any word that appears in the scrollable word list box 502 can be directly selected by moving the cursor to the desired word, and leaving the cursor there until the word is selected, which occurs when the timer expires, or by manual intervention. This feature supports rapid selection from a list.

Figure 6:
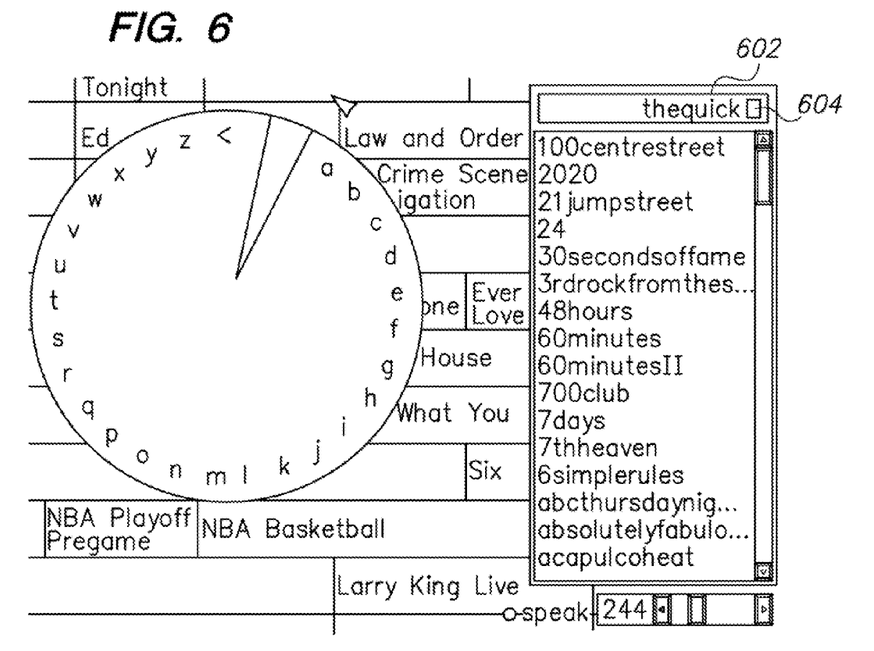
FIG. 6 illustrates the ability to separate words with a blank character according to an exemplary embodiment of the present invention.

According to exemplary embodiments of the present invention, multiple words can be entered. FIG. 6 shows an example of two words separated by the "blank space" character entered into the text box window 602. Long sentences can also be entered. When the length of the entered text exceeds the size of the text box window 602, the entered text will scroll off to the left. This text is not lost and can be viewed by the scrolling the text box cursor 604. As the cursor approaches the left side the text will scroll right revealing that portion of text.

According to some exemplary embodiments of the present invention, remote control devices which are used in conjunction with the pie widget 300 may have a scroll-wheel 110. The scroll-wheel 110 can be used to perform, among other things, one or more of the following three operations: (1) scroll the text box cursor 304 in the upper text box 302; (2) scroll the selection in the text list box 306; and (3) scroll the pie menu slice selection. Initially the wheel is associated with the text box 302. To change the wheel association to a different Graphical User Interface (GUI) object, the wheel can be pressed as a button. Thus, pressing the scroll wheel 110 will change the scroll wheel association to a different GUI object, e.g., the text list box 306. Pressing the scroll wheel 110 again will shift the association to the next GUI object, e.g., the pie widget 300. Pressing the wheel once again will return the association back to the text box 302. When associated to the pie widget 300, rotating the wheel will change which sector is selected. According to one exemplary embodiment, after the character "Z", the next rotation of the wheel selects the center of the pie widget 300. Pausing on the center circle will reset the text entered. The timer can work in this mode in the same manner as previously described for a character selection behavior.

Figure 7:
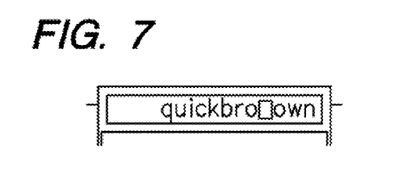
FIG. 7 shows text box cursor movement for the exemplary embodiment of FIGS. 3-6.

According to an exemplary embodiment of the present invention, characters can be inserted and deleted anywhere in the text box. The location of the insertion or deletion is controlled by the location of the text box cursor. The user controls the location of the text box cursor by rolling the scroll wheel. Each click of the scroll wheel will move the text box cursor left or right by one character position. FIG. 7 shows the text box cursor positioned within the word "broown". The text box cursor in FIG. 7 is positioned in preparation to delete the extra letter "o".

Figure 9:
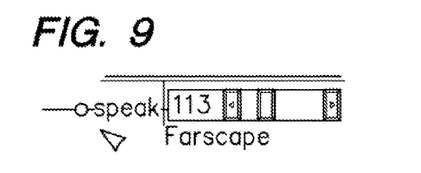
FIG. 9 shows a speak toggle button usable in conjunction with the exemplary embodiments of the present invention shown in FIGS. 3-7.

According to some exemplary embodiments of the present invention, the pie text entry widget can also include a text-to-voice feature. The toggle button labeled "speak" as shown in FIG. 9 enables the voice response feature. When enabled, each character will be enunciated at the time of entry. This can, for example, replace the change in display (e.g., green to red coloring or changes in highlighting) used to indicate a final character selection in the above-described embodiments. The character name can be audibly output rather than the sound of the letter. When a space is entered all of the entered text up to that point can be output as voice, in which case the user will hear the sound of the words rather than the names of the letters.

Second Exemplary Embodiment

Zoomable Text Entry Interface

According to another exemplary embodiment, text can be easily and efficiently entered without a keyboard using a pointing and clicking device in conjunction with a zoomable interface with a visual display. According to these exemplary embodiments of the present invention, a pointer is moved, and a box, for example, containing text can be selected. When the box is selected, the screen zooms in on this selection. The graphics around the box will fade or move toward the display edge as the selected item grows and new graphics (representing subsequent potential selections) will be displayed inside the growing selected box. This zooming action can be repeated as required for each selection until a word (or selectable GUI object) is identified.

Figure 10:
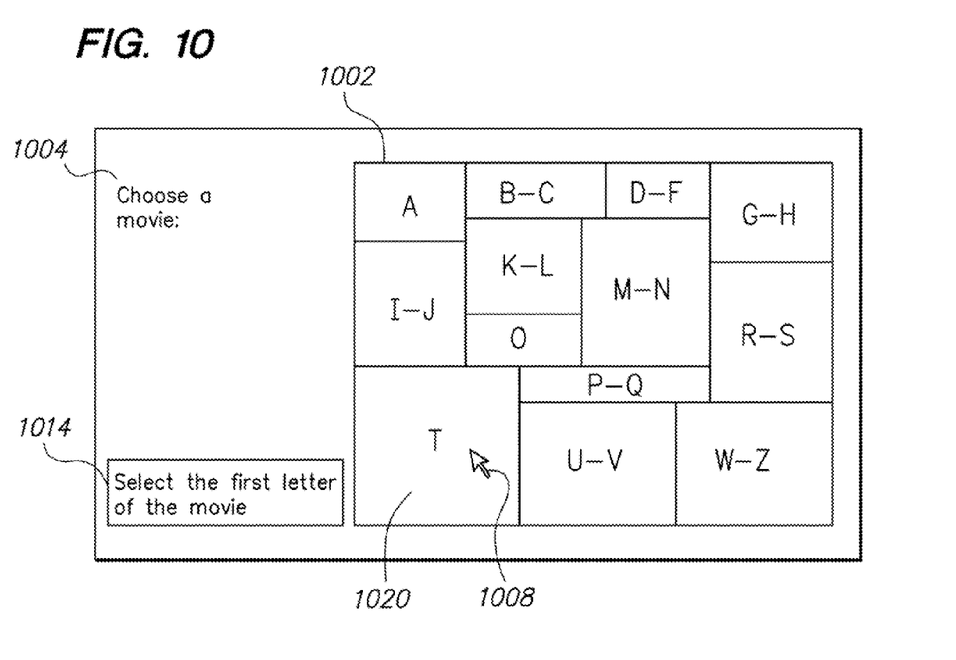
FIG. 10 depicts a zoomable keyboardless text entry interface according to an exemplary embodiment of the present invention.

A display containing various GUI elements works in conjunction with a zoomable, keyboardless text entry interface, as shown in FIG. 10. Exemplary GUI elements illustrated in this example include a request string section 1004, a directions section 1014, and a selection window 1002. Other elements could be added, depending on, for example, the need at a given level of zoom, such as a current word section or a possible word completion list section. The selection window 1002 has a shape 1020 for each character or range of characters, in this example the shapes are squares or rectangles although the present invention is not so limited. The size of the shapes can represent the number of words that are "underneath" the shape. That is, the size can be proportional to the number of words that are possible (feasible) should that block be selected. For example, the area of the box containing "R-S" in FIG. 10 is greater than the area of the box containing the letter "A" because there are more words (or selections) available which begin with the letters "R" and "S" than which begin with the letter "A".

Figure 11:
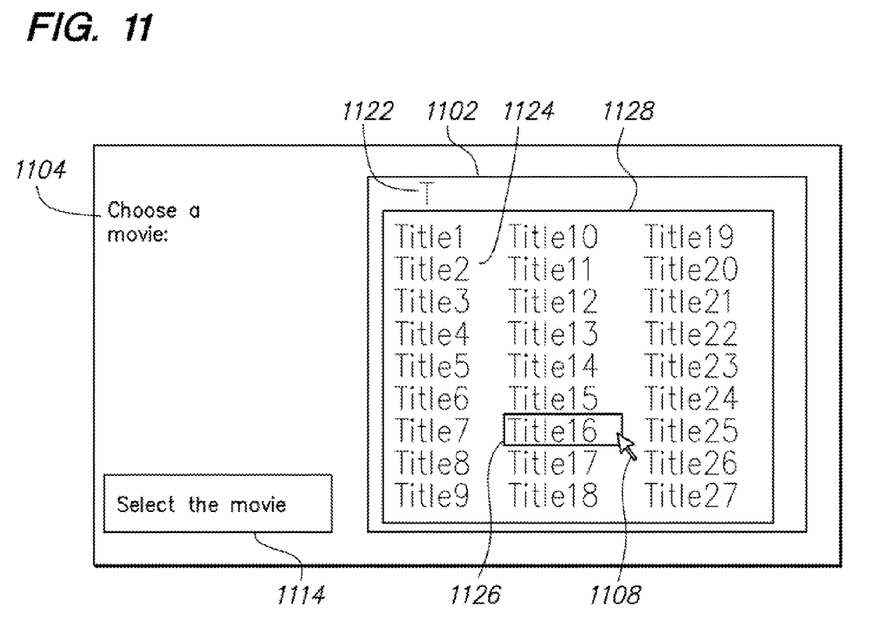
FIG. 11 shows an updated zoomable display based on a user entry to the zoomable keyboardless text entry interface of FIG. 10.

The user moves a pointer 1008 to select the letter or range of letters that begins their desired word. When the user selects a shape using a selection device such as a mouse or other pointer, the selection window zooms into that shape independently from the main view and reveals other letters, words or phrases which are potential subsequent selections. Selection can occur using any of a variety of methods such as, for example, clicking the selection that is currently being pointed to or using a timer as described above with respect to the pie widget embodiments. Zoomable keyboardless text entries according to these exemplary embodiments reveal subsequent selection options by zooming between different magnification levels. The selection options can, for example, be subsequent character choices or ultimate word or phrase choices. For example, FIG. 11 shows the displayed result after the user selects the character "Z" in FIG. 10 and a zoom is performed to reveal a number of title selections associated with movies that can be accessed via this application. As shown in FIG. 11, in addition to changing the selection items, other element areas change or become updated based on a user's action. For example, as shown in FIG. 11, the directions section 1114 has been updated to inform the user as to what actions to perform next, and as before, the pointer 1108 can be moved to select the desired word or phrase. In the illustrated example, the user is pointing to "Title 16", and the interface provides feedback by drawing a box 1126 around the current entry.

Figure 12A:
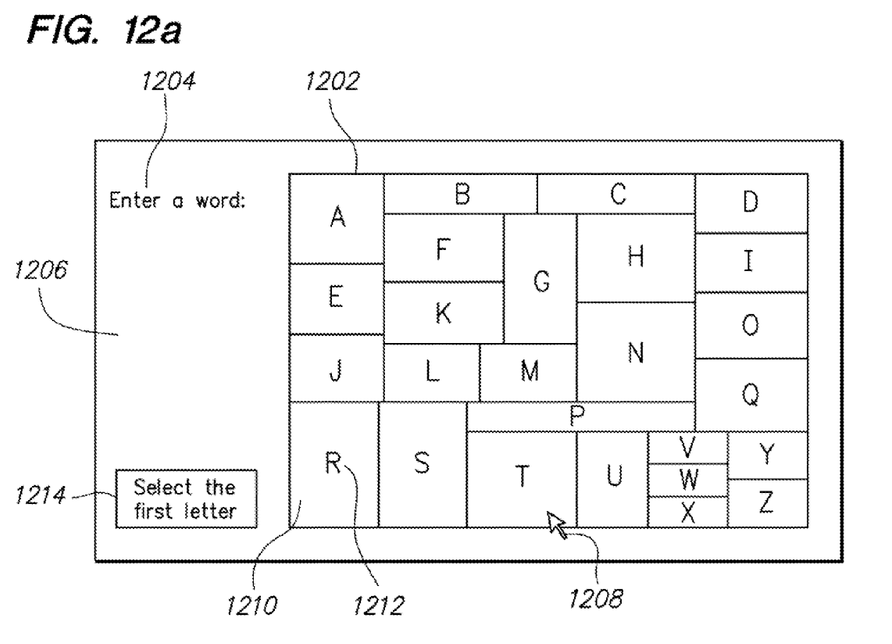
FIG. 12(a) shows entering a selection to a zoomable keyboardless text entry interface with a pointing device according to an exemplary embodiment of the present invention.
Figure 12B:
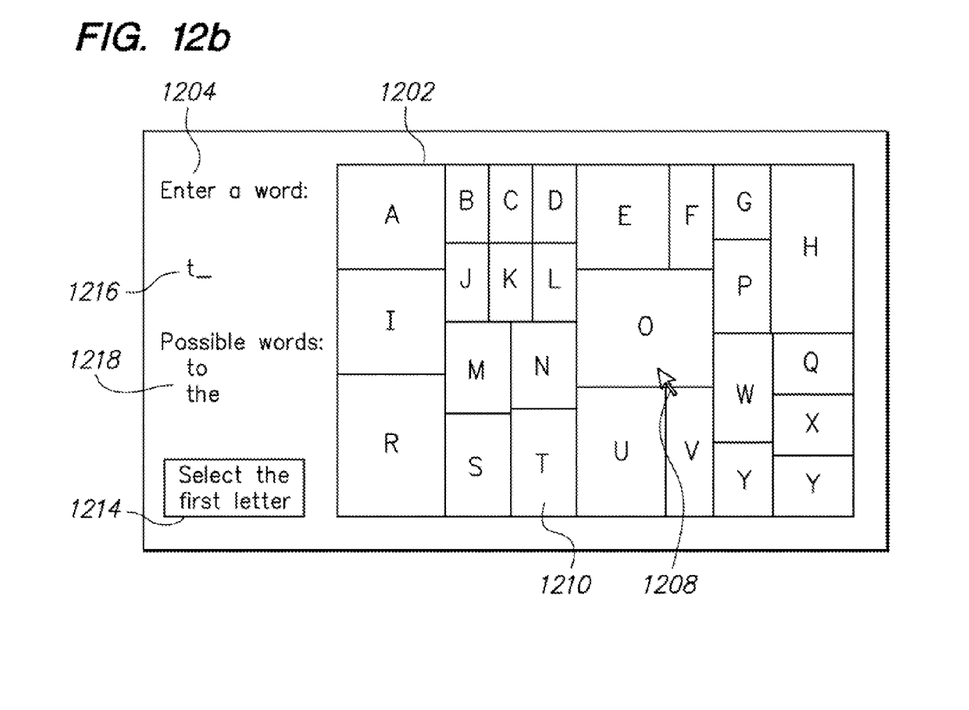
FIG. 12(b) shows a resulting display based on a user's selection of a character in the zoomable keyboardless text entry interface of FIG. 12(a)
Figure 12C:
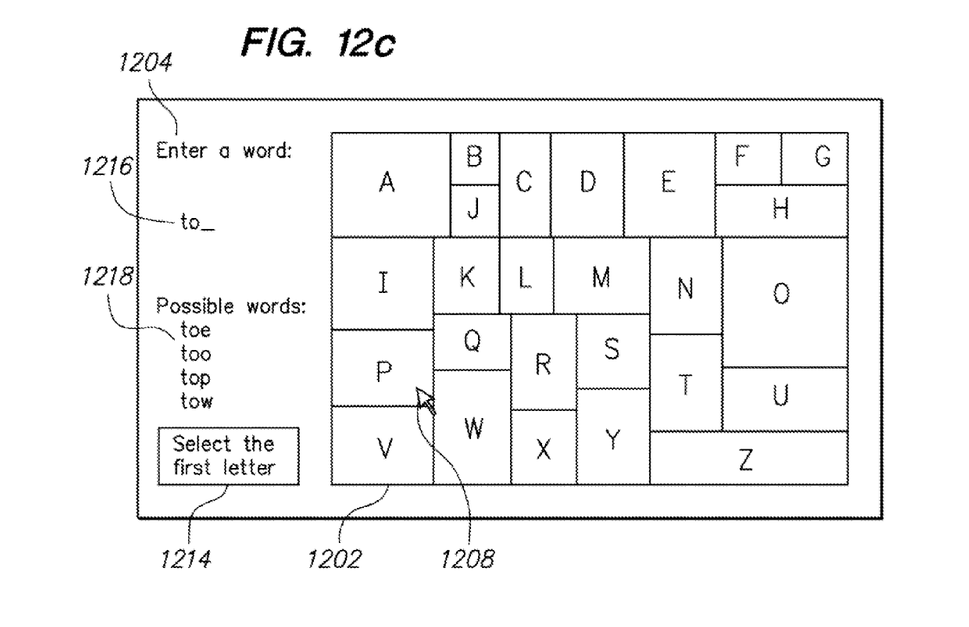
FIG. 12(c) shows a resulting display based on a user's selection of the characters "to" in the zoomable keyboardless text entry interface of FIGS. 12(a) and 12(b)

According to other exemplary embodiments of the present invention, words can be entered by using only a pointing device as shown in FIGS. 12(a), 12(b) and 12(c). Therein the interface contains a selection window 1202, directions section 1214, request section 1204, a pointer 1208, and a section to display the current word and/or list possible completions 1206. In the selection window 1202 shapes are displayed which are associated with the current letters 1212 that are available for selection. In addition to letters, symbols, numbers, icons, word parts, mixed case letters and any other characters could be used. For example, if the pending word entry were the letters "explana_", one of the selection areas could contain the word fragment "tion". The sizes of the shapes may correspond to the number of words or selections that are feasible if that selection is made.

In FIG. 12(a), the user selects the shape with the letter "T". This causes the selection window 1202 to zoom into the "T" and reveal choices for the next letter as shown in FIG. 12(b). The aspect ratio and shape of the selected letter are stretched so that only choices for the next character are shown. Also as shown in FIG. 12(b), the interface updates the current word that is being spelled 1216 and lists possible completions 1218. The user can move the pointer to these completions and select them to finish off the word. In the case illustrated, the user selects the shape with the "O" in it, and the interface animates a zoom into the "O" to reveal another set of shapes with letters as shown in FIG. 12(c). To complete the word "top", the user can select "top" in the list of possible completions 1218 or select the "P" from the selection window 1202. To assist in usability any of the following modifications could be used either by themselves, or in combination: (1) shapes could be provided which are associated with actions to perform, for example, such actions as either character erasure, or to initiate a search; (2) the selection that the pointer is currently over can be identified by either a highlight, slight enlargement, or performing an animation; and (3) shapes could be colored or otherwise adjusted to provide visual distinctiveness in addition to the indicated character(s) association.

In another exemplary embodiment of the current invention, the user may need to select from a large list of text items, such as movie names, artists, music album names, phone directory listings, business listings, etc, or the user may need to enter arbitrary text. In the former situation, the user can be presented with a selection window in its zoomed out state. From here the user proceeds to click on the beginning letter or letters of the item that they want to find. In response, the interface animates a zoom operation into the shape containing the letter and reveals a next set of letters or a list of items. The user can then select the desired item or press a go back control to return to the top level zoomed out state. The latter situation is very similar, except at each zoom level, the interface presents subsequent letters that could be concatenated to the word. The display areas of these letters can also correspond to their probability of being next. In addition, those skilled in the art will appreciate that the present invention is equally applicable to embodiments wherein multiple zoom options could exist, e.g., zoom in, zoom out, zoom to any previously viewed level, or partition the screen to show multiple zoom levels simultaneously.

In another exemplary embodiment of the current invention, the size of each selection shape 1020 is proportional to the likelihood that an available word represented by that selection will ultimately be the word that is selected. This could result in a different shape size than embodiments which size the shape based solely on the number of feasible words represented by that selection. One example of shape sizing using this criterion is sentence entry. At a point in a sentence, many adjectives may be appropriate (feasible), but the number of nouns may be relatively few. Since a user is more likely to pick a noun over a long string of adjectives, the nouns can be represented with larger rectangles. A process that tracks the context and semantics of the environment in which the selection is being made could assign likelihood values to each of the feasible words represented by the selection. This would enhance the experience by improving the prediction of what the user's most likely selection would be. This could be further extended to symbols, numbers, icons, and mixed case letters, etc.

Based on one or more predetermined criteria, e.g., ultimate probability of selection or raw number of feasible selections, the shapes (e.g., rectangles) can be drawn on the screen using a number of different techniques at each zoom level of the text entry tool. One such technique involves using a treemap algorithm to perform the shape sizing based on the predetermined criteria. An exemplary treemap algorithm is known as a "quantum treemap" algorithm, which is described in the article entitled "Ordered and Quantum Treemaps: Making Effective Use of @d Space to Display Hierarchies" by Benjamin B. Bederson et al., *ACM Transactions on Graphics* (*TOG*), Volume 21, Issue 4, October 2002, pp. 833-854, the disclosure of which is incorporated here by reference. Using this algorithm, the number of word or letter choices available at a particular zoom level in the zoomable, keyboardless text entry interface can be separated into bins so that the ratio between the largest to smallest bin is less than roughly a factor of 3 (although this factor can be adjustable) and that the number of bins is limited to a predetermined maximum. These features prevent the treemap algorithm from generating rectangles that are too small to target with a pointing device.

Third Exemplary Embodiment

Rows of Keys with Result Display

Figure 13:
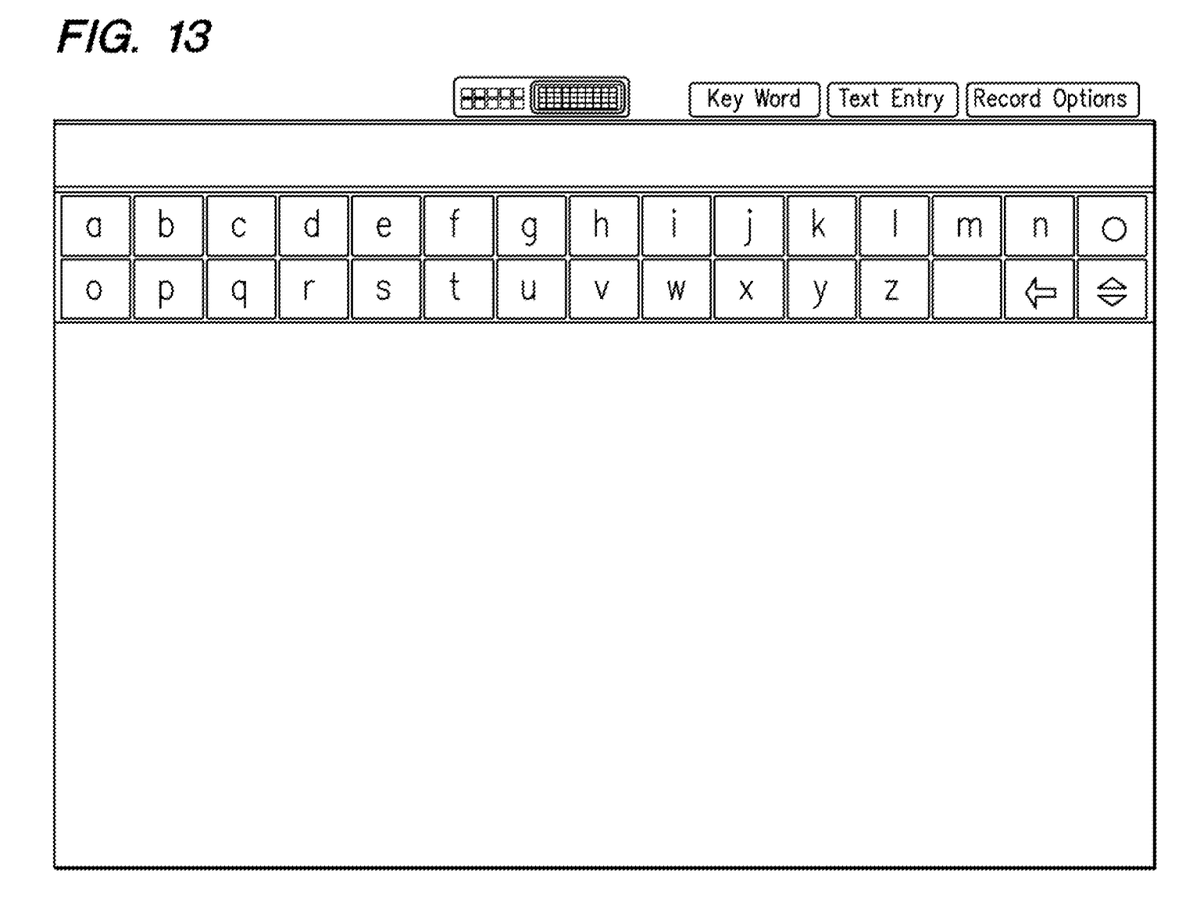
FIG. 13 displays a keyboardless text entry system based on two rows of characters according to another exemplary embodiment of the present invention.
Figure 14:
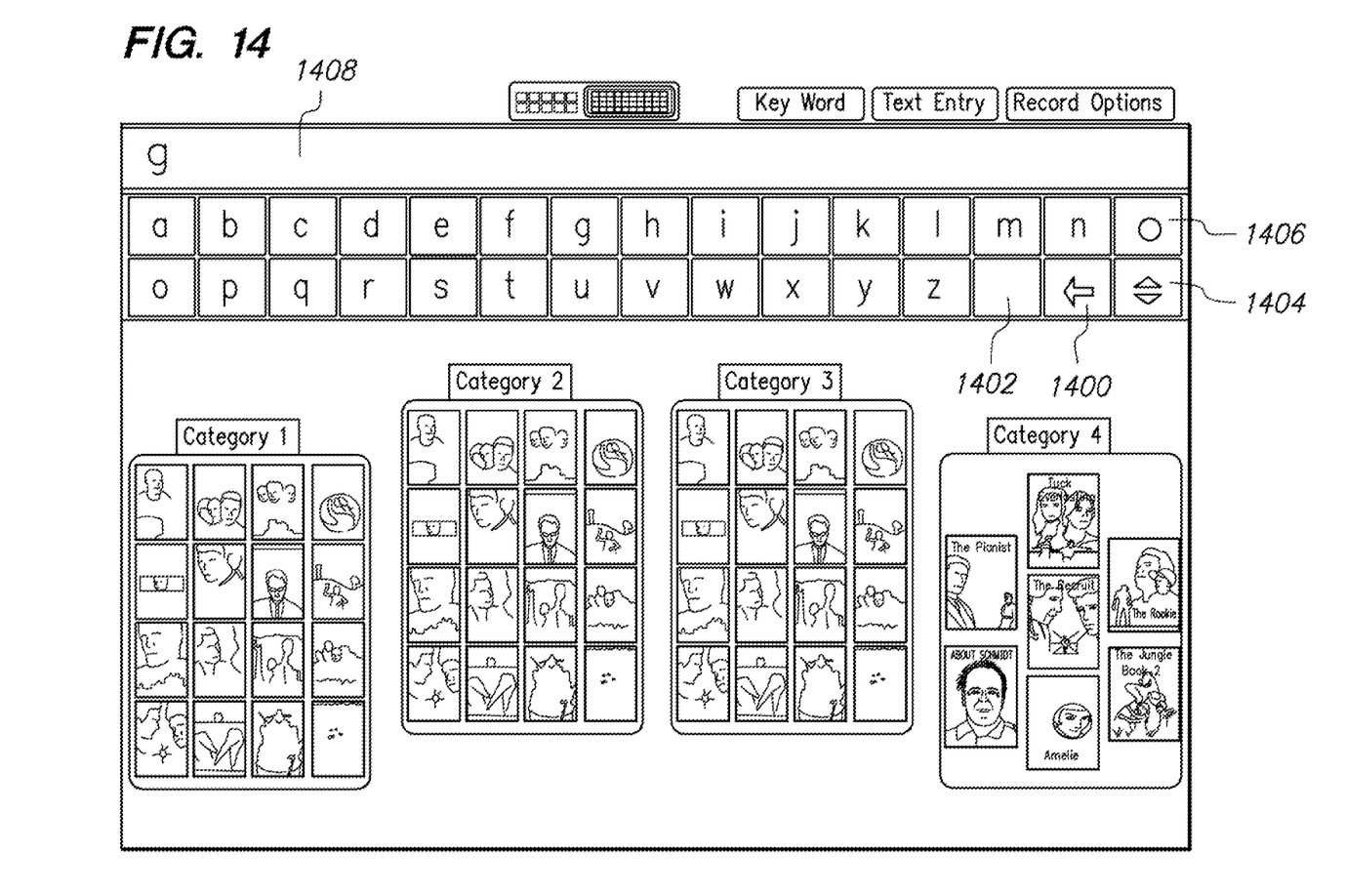
FIG. 14 illustrates an exemplary way in which text entry results and/or potential selections can be displayed using the keyboardless text entry tool of FIG. 13.
Figure 15:
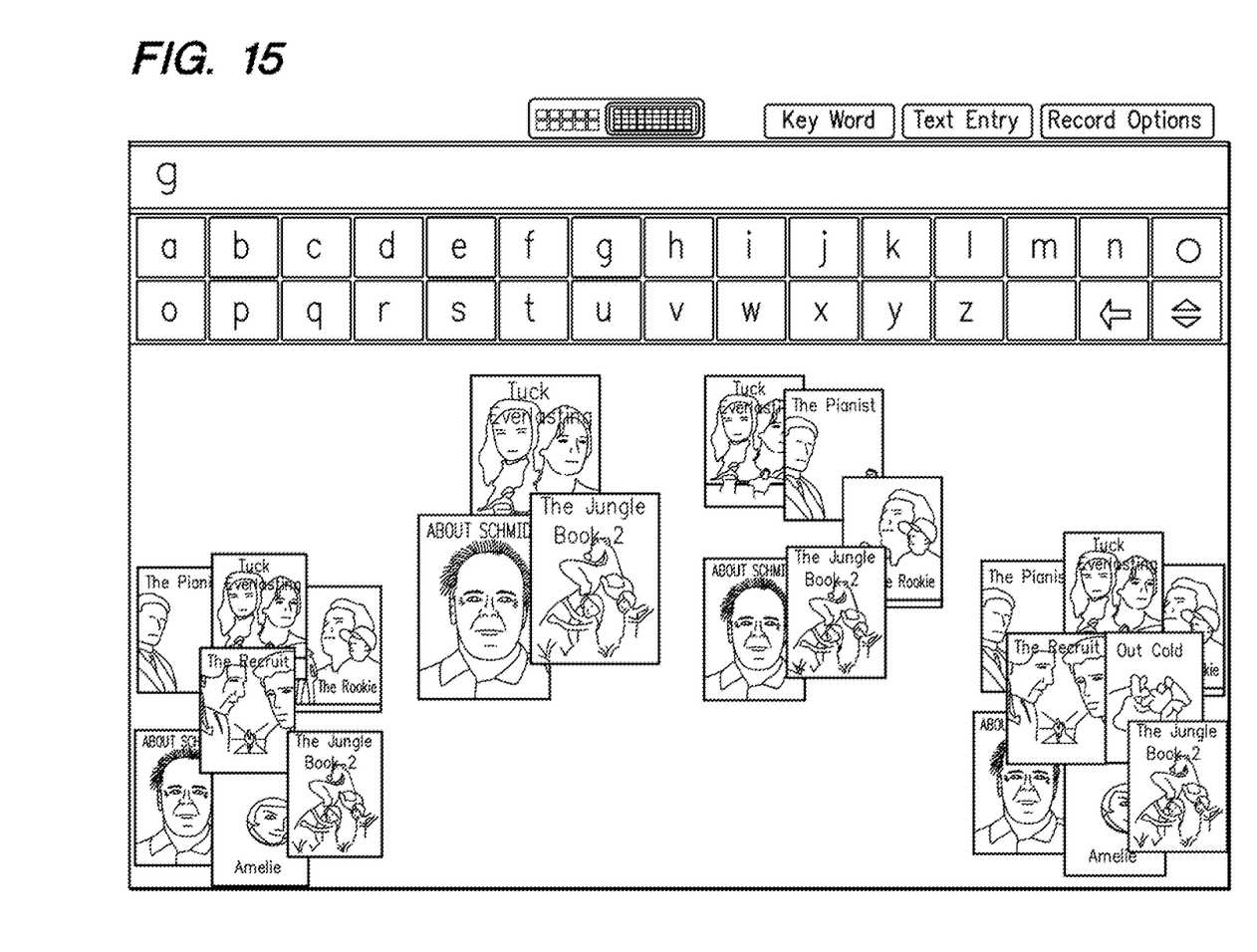
FIG. 15 is used to describe a method of selection display based on a user entry according to an exemplary embodiment of the present invention.
Figure 16:
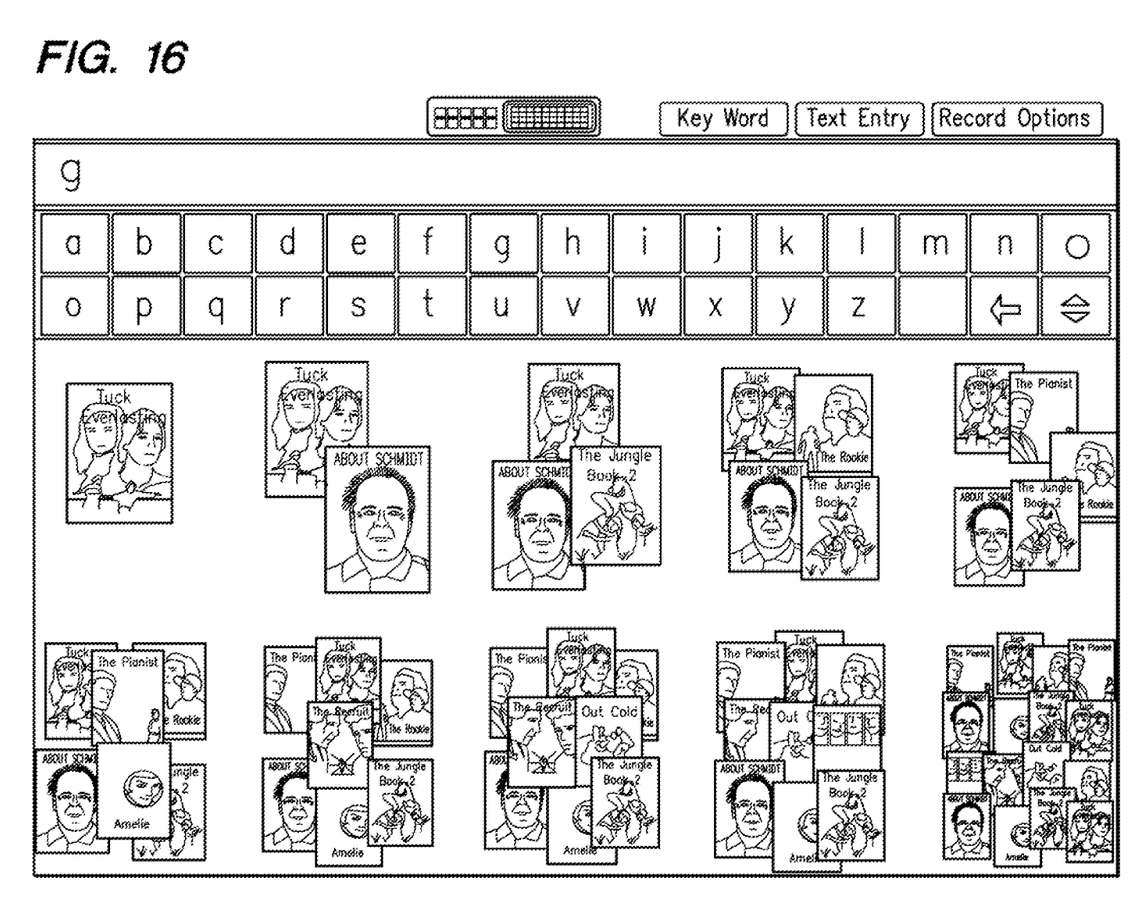
FIG. 16 displays another method of selection or result display associated with a user's keyboardless text entry according to an exemplary embodiment of the present invention.
Figure 17:
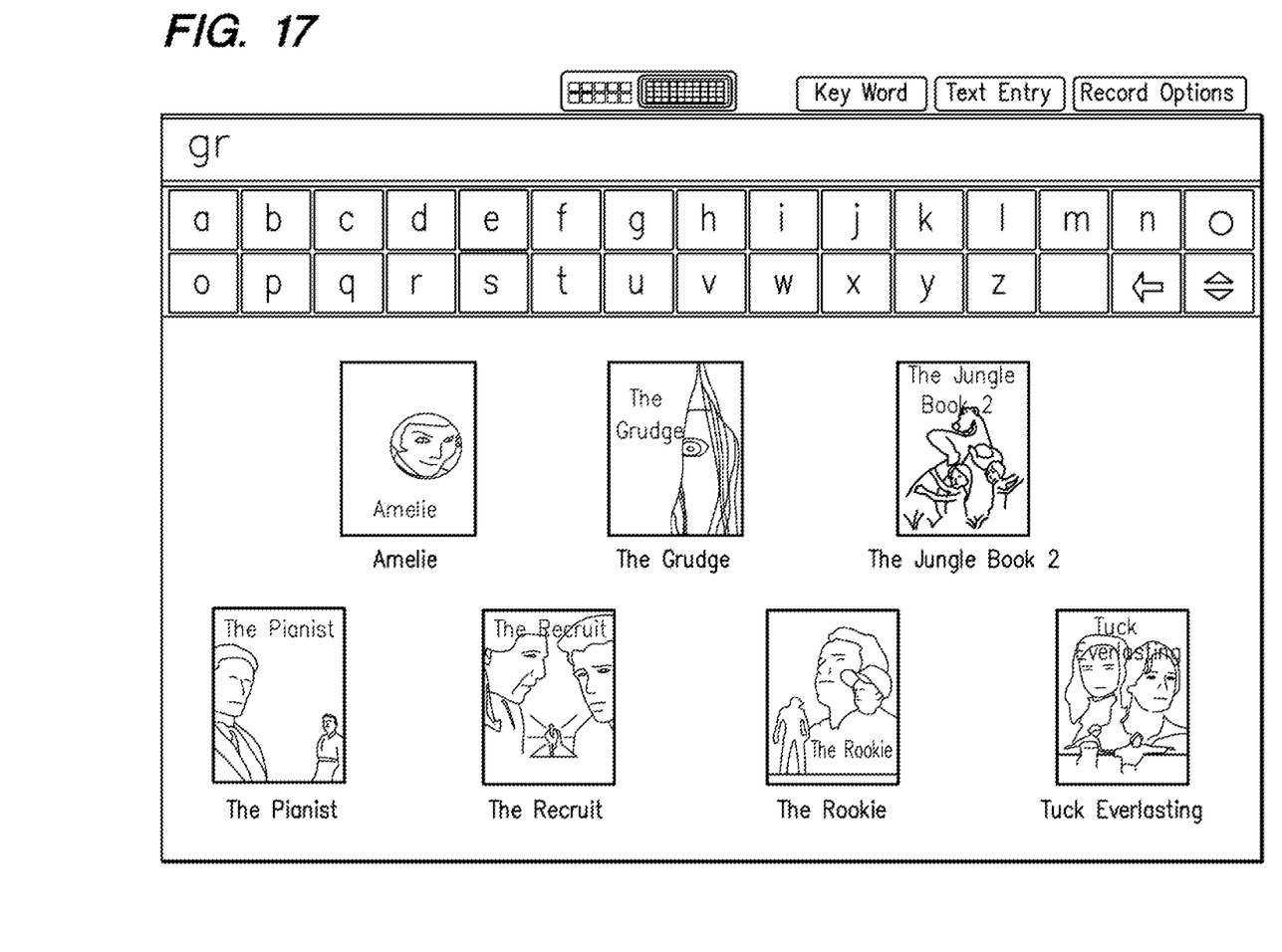
FIG. 17 displays selection refinement based on a user entry according to an exemplary embodiment of the present invention.
Figure 18:
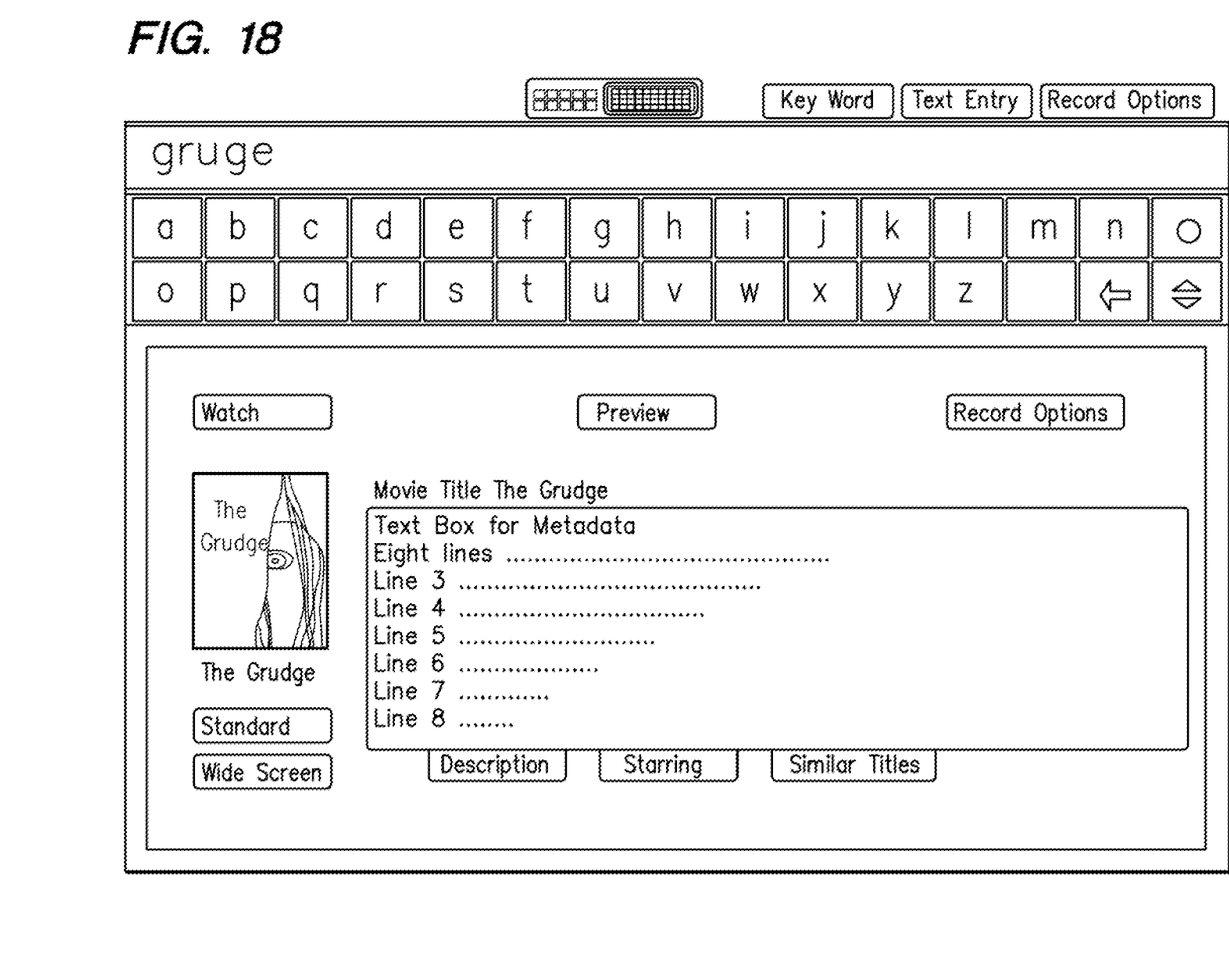
FIG. 18 displays additional selection refinement based on user entries.

According to yet another exemplary embodiment of the present invention two rows of characters can be displayed proximate the top of a screen that can be used for text entry purposes without the need for a keyboard as shown in FIG. 13. Among other things, this approach provides various benefits. Firstly, when pointing, it is more efficient to move a cursor in substantially one axis of motion as compared to large, abrupt motion changes. Secondly, by placing the text entry tool toward an edge of the display, the remaining space is maximized to display choices based on text entry. As in the previous embodiments, characters can be selected by positioning a cursor over a desired key and then either waiting for the expiration of a timer or explicitly making a final selection via, e.g., a button press. When text is entered, as shown in FIG. 14, resulting potential groups of selections can then be displayed and scaled below the rows of text. In this example, the potential selection groups are represented by cover art associated with selectable movies, however it will be appreciated that this is purely illustrative. These groups can be scaled so as to be visually pleasing and to have the user avoid perceiving that anything is missing within the group. Other visually pleasing displays could be used such as, for example, the displays shown in FIGS. 15 and 16. The content of the groups' changes and becomes more refined as more text is entered and searching occurs as shown in FIGS. 17 and 18.

The two rows of characters displayed in this exemplary embodiment are text with a few additional characters. Text characters predominate this exemplary keyboardless text entry interface, since (for some applications) text is the predominant entry type and minimizing the total number of choices will speed up entry. For cases when other entries are needed, a backspace button 1400, a blank space button 1402, a back button 1406 and an expand button 1404 are included in this exemplary embodiment of the present invention. The backspace button 1400 erases previously entered text selections in the display box 1408. The blank space button inserts a space in the display box 1408. The back button 1406 replaces the current display results with the previous display results and corresponding text entry in display box 1408. The expand button character 1404 allows access to other characters such as numbers, symbols, etc, by displaying one or more additional rows of characters (not shown).

Systems and methods for keyboardless text entry according to exemplary embodiments of the present invention can be performed by one or more processors executing sequences of instructions contained in a memory device (not shown). Such instructions may be read into the memory device from other computer-readable mediums such as secondary storage devices. Execution of the sequences of instructions contained in the computer-readable medium and/or memory device causes the processor to operate, for example, as described above to handle keyboardless text entry. In alternative embodiments, hard-wire circuitry may be used in place of or in combination with software instructions to implement the present invention.

Numerous variations of the afore-described exemplary embodiments are contemplated. For example, other exemplary embodiments of the present invention can contain such features as a vocabulary not limited to any particular set of words (characters, symbols, etc.), and a dictionary assist on words entered. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. An interface input method comprising the steps of:
   displaying an entirety of two rows of keys proximate an edge of a display screen, each key being associated with one character, wherein said two rows of keys comprises twenty-six alphabetical letters, a back button, a blank button, a backspace button, and an expand button;
   selecting said one character by positioning a cursor over said key associated with said one character, wherein said cursor is a movable overlay, movable in any direction;
   displaying said one character associated with said key in a text box on said display screen; and
   displaying candidate items for selection in a display area beside said two rows of keys, wherein said candidate items for selection are chosen based on text displayed in said text box,
   wherein said one character is automatically selected with an expiration of a timer by positioning said cursor over said key associated with said one character and waiting for said expiration of said timer,
   further wherein a timer value of the timer is automatically adjustable based on user behavior,
   further wherein selection of said expand button results in a display of one or more extra rows of additional characters in addition to said two rows of keys already displayed.

2. The method of claim 1, wherein said displayed candidate items are images associated with movies.

3. A non-transitory computer-readable medium containing a program which, when executed, performs the steps of:
   displaying an entirety of two rows of keys proximate an edge of a display screen, each key being associated with one character, wherein said two rows of keys comprises twenty-six alphabetical letters, a back button, a blank button, a backspace button, and an expand button;
   selecting said one character by positioning a cursor over said key associated with said one character, wherein said cursor is a movable overlay, movable in any direction;
   displaying said one character associated with said key in a text box on said display screen; and displaying candidate items for selection in a display area beside said two rows of keys, wherein said candidate items for selection are chosen based on text displayed in said text box, wherein said one character is automatically selected with an expiration of a timer by positioning said cursor over said key associated with said one character and waiting for said expiration of said timer, further wherein a timer value of the timer is automatically adjustable based on user behavior, further wherein selection of said expand button results in a display of one or more extra rows of additional characters in addition to said two rows of keys already displayed.

4. A system for keyboardless text entry comprising a memory device and a processor device, wherein said system is configured to:

display an entirety of two rows of keys proximate an edge of a display screen, each key being associated with one character, wherein said two rows of keys comprises twenty-six alphabetical letters, a back button, a blank button, a backspace button, and an expand button;

select said one character by positioning a cursor over said key associated with said one character, wherein said cursor is a movable overlay, movable in any direction;

display said one character associated with said key in a text box on said display screen; and display candidate items for selection in a display area beside said two rows of keys, wherein said candidate items for selection are chosen based on text displayed in said text box, wherein said one character is automatically selected with an expiration of a timer by positioning said cursor over said key associated with said one character and waiting for said expiration of said timer, further wherein a timer value of the timer is automatically adjustable based on user behavior, further wherein selection of said expand button results in a display of one or more extra rows of additional characters in addition to said two rows of keys already displayed.

* * * * *